US008501650B2

(12) United States Patent
Di Loreto

(10) Patent No.: US 8,501,650 B2
(45) Date of Patent: Aug. 6, 2013

(54) DRY MIX FOR TREATING REFRACTORY SUBSTRATES AND PROCESS USING SAME

(75) Inventor: Osvaldo Di Loreto, Boussu (BE)

(73) Assignee: Fib-Services Intellectual S.A., Luxembourg (LU)

( * ) Notice: Subject to any disclaimer, the term of this patent is extended or adjusted under 35 U.S.C. 154(b) by 711 days.

(21) Appl. No.: 12/667,837

(22) PCT Filed: Jul. 3, 2008

(86) PCT No.: PCT/EP2008/058563
§ 371 (c)(1),
(2), (4) Date: Feb. 19, 2010

(87) PCT Pub. No.: WO2009/004052
PCT Pub. Date: Jan. 8, 2009

(65) Prior Publication Data
US 2010/0196609 A1    Aug. 5, 2010

(30) Foreign Application Priority Data
Jul. 5, 2007   (BE) .................................. 2007/0336

(51) Int. Cl.
*C04B 38/00* (2006.01)
*C04B 35/14* (2006.01)

(52) U.S. Cl.
USPC ............... 501/80; 501/32; 501/133; 501/155; 106/14.05; 106/489

(58) Field of Classification Search
USPC ........ 501/99–101, 133, 80, 32, 155; 427/140, 427/427; 106/14.05, 489
See application file for complete search history.

(56) References Cited

U.S. PATENT DOCUMENTS

| | | | | |
|---|---|---|---|---|
| 5,002,805 A | * | 3/1991 | Robyn | 427/309 |
| 5,061,526 A | * | 10/1991 | Robyn et al. | 427/422 |
| 5,229,337 A | * | 7/1993 | Robyn et al. | 501/80 |
| 5,833,895 A | * | 11/1998 | Di Loreto | 264/30 |
| 5,961,371 A | * | 10/1999 | Meynckens et al. | 451/38 |

FOREIGN PATENT DOCUMENTS

GB    2233323    1/1991

OTHER PUBLICATIONS

International Search Report in PCT/EP2008/058563 dated Apr. 14, 2009 (5 pages).

* cited by examiner

*Primary Examiner* — Karl Group
(74) *Attorney, Agent, or Firm* — McCracken & Frank LLC

(57) ABSTRACT

Dry mix for treating refractory substrates, comprising combustible particles of at least one oxidizable substance which, in the presence of oxygen, gives rise to an exothermic reaction, and particles of at least one other substance, wherein these particles form together, during said exothermic reaction, a coherent mass capable of adhering to and/or interacting with the treated substrate, characterized in that it comprises, as particles of at least one other substance, particles of at least one expanding substance, in that the dry mix without the particles of this at least one expanding substance has a first bulk density and in that the mix comprising said at least one expanding substance has a second bulk density lower than said first bulk density.

10 Claims, No Drawings

DRY MIX FOR TREATING REFRACTORY SUBSTRATES AND PROCESS USING SAME

The present invention relates to a dry mix for treating refractory substrates, comprising:
 combustible particles of at least one oxidizable substance which, in the presence of oxygen, gives rise to an exothermic reaction, and
 particles of at least one other substance,
wherein these particles together form, during said exothermic reaction, a coherent mass capable of adhering to and/or interacting with the treated substrate, and a process using such a mix.

Refractory walls used in certain production installations suffer damage during service due to erosion, corrosion, thermal shock etc., which renders their surface rough, porous or marked with defects (scaling, cracking, cavities etc.). This can have various consequences for the operation of the production installations: hindering the circulation of solid products, incrustation, leakage of fluid or gas, penetration of corrosive agents; in particular in coke ovens, walls of refractory silica in the carbonisation chambers become lined with carbon which over the course of time transforms into graphite and swells; it must be eliminated regularly to avoid a power overload on discharge of the coke. Similarly, the coal charging zone is also subject to such carbon deposits, which require manual removal at regular intervals. Also, continuous cracks between the carbonisation chamber and the heating flues allow the passage of organic matter towards the chimney, with the resulting ecological consequences.

These various faults and damage phenomena have led to the development of several methods of repair or treatment of refractory substrates.

For example, patent application FR-A-2202053 describes a method of projection onto a damaged wall, at high temperature, of an aqueous solution containing for the majority a refractory granular material of the same nature as the wall (silica), a binder (alkali metal borate or carbonate type), a colloidal thickener (bentonite) and a compound to lower the melting point (sodium silicate).

Patent application WO 2004/085341 also discloses the application to the substrate by dry gunning of a mixture comprising for the majority grains of vitreous silica, an aluminous granulate, a clay and a chemical binder.

Patent application FR-A-2524462 describes a method of flame spraying of a mixture comprising for the great majority particles of silica, calcium oxide and an addition of lithium oxide.

Reference may also be made to the family of patents relating to ceramic welding, which comprises the projection against a wall, at high temperature and in a flow of oxygen, of a mixture comprising for the majority refractory grains (silica, alumina, zirconia, etc.) and oxidizable particles (Si+Al) which, by exothermic reaction (combustion), form a coherent refractory mass on the wall to be repaired (see amongst others FR-A-2066355, FR-A-2516915 and BE-1005914).

These four methods allow application to the refractory substrate to be treated or repaired, of a thick, coherent refractory layer or mass which adheres to the surface of the substrate and/or interacts with this. These methods all use, for the composition of the mixture, a granular refractory material bonded by fusible components or components melted with a flame.

During the operation of repair by reactive projection, the quality of the coating obtained on the generally refractory wall depends on several parameters, including in particular the temperature of the support, the speed of projection and the mass flow of the mixture.

In this type of process, and in particular in the case of ceramic welding, the carrier gas is a gas which is reactive with at least one of the elements of the powdery material. On contact with the hot wall, the mixture reacts spontaneously and a series of chemical reactions leads to the formation of an adhesive refractory material, the characteristics of which are compatible with those of the treated support.

The speed of projection is therefore a preponderant element. If this is too high, the quantity of material may not react (as it does not participate in the exothermic reaction), and may rebound too strongly on the wall, to the detriment of the quality of the magma formed by projection.

The object of the present invention is to develop a dry mix for treating refractory substrates and a process for its use which allows a slower and controlled projection speed, avoiding the possibility of flame back, so as to produce a suitable surface treatment, using a simple and effective compound.

To achieve this object, according to the invention a dry mix can be used such as described initially which comprises also, as particles of at least one other substance, particles of at least one expanding substance, the dry mix without the particles of this at least one expanding substance having a first bulk density and the mix comprising said at least one expanding substance having a second bulk density lower than said first bulk density.

Due to its high specific volume (grain density preferably less than 2, advantageously less than 1.5, and in particular less than 1), the expanding substance gives the mix for projection a lower hulk density, which helps slow the projected mass flow and hence reduce the thickness of the layer deposited (of the order of millimeters) on the surface of the refractory on each passage of the spray jet. Application can be made in a single passage (surface treatment) or in several passages (filling a crack or cavity).

Said at least one expanding substance can be selected from expanded perlite, expanded vermiculite, powdered wood or coke, and their mixtures.

Preferably expanded perlite is used. Perlite is a granular silica glass of volcanic origin, which can be expanded thermally in order to obtain particles of expanded perlite. Preferably the size of the expanded perlite particles is less than or equal to 1 mm.

Unexpectedly, it has also been found that the presence of expanded perlite in the mix improves its stability (no segregation due to vibration). In fact it has been found that, during storage or transport of the mix when it may be subjected to shaking or vibration, the mix shows no sign of downward segregation of the combustible particles of the mix, which is the case if there are no expanded perlite particles.

Suitable oxidizable substances could be fine particles of one or more metals or metalloids capable of burning in the presence of oxygen, in particular at the normal operating temperature of the furnace to be repaired. Preferred substances may be particles of silicon, aluminium, zirconium, magnesium, calcium or even iron, chromium, titanium, or their mixtures or alloys. Preferably the size of the combustible particles is less than or equal to 100 μm.

In another embodiment of the invention, said particles of at least one other substance, are selected from the group comprising siliceous glass, vitreous or fused silica, and crystalline silica such as quartz, tridymite and cristobalite; alumina, zircona, magnesia, lime, alkaline compounds and their mixes or mixed compounds. Preferably the size of the silica particles is less than or equal to 0.5 mm, preferably between 0.1 and 0.3 mm.

Siliceous glass here means any glass containing silicon. Preferred glasses are silico-sodo-calcic glasses, borosilicates, cullet or broken glass advantageously obtained from untinted glass, and mixtures of these materials. Preferably the size of the particles of siliceous glass is less than or equal to 1 mm so as to ensure total fusion of the particles. Advantageously their size is between 0.3 and 0.6 mm.

A preferential mix according to the invention contains siliceous glass as the majority by weight of the dry mix. This term means that the weight fraction of the siliceous glass is greater than that of any other constituent in the mix.

Such a mix is perfectly suitable for a treatment process of the well known and controlled type of ceramic welding, where the addition of heat results mainly from an exothermic oxidization of the combustible particles of the mix. In the presence of oxygen and at the operating temperature of the furnace, combustion is spontaneous and the siliceous glass particles melt completely to form an amorphous mass capable of being spread in a thin layer on the refractory wall to be repaired, and infiltrating into the cracks formed in this wall. The layer deposited is thin and has a smooth aspect which does not promote the adhesion of carbon deposits. The Ra roughness is of the order of 50-100 μm. Calculation of the roughness complies with standard ISO 11652 and ISO 4287-1997. This Ra value is the arithmetic standard deviation of the surface profile, i.e. the arithmetic mean of the absolute values of the profile deviations (as peaks or hollows) within the limits of a base length L.

The coherent mass applied to the refractory wall to be treated constitutes either a surface treatment to smooth a rough refractory wall, for example at the coal charging opening in a coking plant, or a means for filling fine cracks without applying excess thickness to the damaged refractory wall.

The refractoriness or high temperature strength of the resulting amorphous mass may advantageously be adapted to the service temperature via the proportion of silica added in relation to that of the crushed siliceous glass.

By adjustment of the weight proportion between the particles of siliceous glass and the particles of silica, a deposit can be obtained of extremely thin layers of a thickness of less than 2 mm per passage of the spraying machine. These layers have an extremely smooth surface which does not promote the adhesion of carbon deposits during operation of the furnace treated. Advantageously, this weight ratio may be between 3/1 and 6/1.

In a refined embodiment of the invention, the mixture contains:
a) 0 to 88%, particularly 45 to 60% by weight of siliceous glass particles,
b) 10 to 40%, in particular 20 to 30% by weight of combustible particles,
c) 2 to 40%, in particular 5 to 10% by weight of expanded perlite particles,
d) 0 to 88%, particularly 10 to 25% by weight of silica particles, the sum of the percentages by weight of constituents a) to d) giving 100% by weight.

The invention also concerns a process for treatment of a refractory substrate of the type of ceramic welding process. It comprises projection onto this substrate of a jet of dry mix according to the invention in the presence of oxygen and at a temperature at which said combustible particles give rise to an exothermic reaction with said oxygen, and an at least partial fusion of particles of the mix in the form of a coherent amorphous mass which adheres to and/or interacts with the substrate. By using for example siliceous glass as the majority by weight of the mix, advantageously a complete fusion of the particles can be obtained. Advantageously the process comprises movement of the jet of dry mix during projection, forming a deposit of a uniform thin layer on the substrate. Successive repeated passages can also be performed at the same place on the substrate in order to obtain a superposition of thin smooth layers, one upon the other.

In a refined embodiment of the invention, the process comprises, after projection, annealing of said mass adhering to the substrate at a temperature at least greater than its vitreous transition temperature. This allows the amorphous mass deposited to complete its densification and perfect the smooth state of the surface.

This ability to create a molten mass on the surface of the refractory wall leads to another field of application of the invention, namely a process for descaling and/or machining of a refractory wall. The process according to the invention can in fact be applied to a glass-making furnace to descale a refractory wall in the superstructure or to cut perforations in blocks in order to later anchor a product which will be deposited by ceramic welding. The coherent mass formed interacts with the substrate to the point of causing it to melt and flow, with the aim of modifying its profile or hollowing it out (perforation for anchoring).

The present invention will be explained in more detail with reference to the examples given below which are non-limitative.

EXAMPLE 1

The mixture to be projected comprises:
76% crushed silico-sodo-calcic glass (0.2-1 mm)
18% crushed silicon (<50 μm)
6% fine aluminium (<63 μm)
and its specific volume after homogenisation is 0.75 liter/kg.

The refractory wall to be treated has a temperature of around 900° C.; the mixture sprayed in the oxygen flow combusts spontaneously and gives rise to an exothermic reaction; a uniform deposit is formed on movement of the jet of powdery mix (mass flow 64.3 kg/hour).

The layer deposited has a relatively smooth aspect (roughness Ra=50-100 μm) and results from complete fusion (no residual grains); the thickness is around 3 mm per passage of the spray jet; it adheres strongly to the refractory wall without detaching or cracking after cooling.

EXAMPLE 2

The mixture this time comprises:
68% crushed silica-soda-calcic glass (fraction 0.2-1 mm)
19% crushed silicon (<50 μm)
6% fine aluminium (<63 μm)
and 7% expanded perlite (fraction<1 mm).

Thanks to the addition of the expanded perlite, the specific volume is substantially higher 0.8 liter/kg) than that of the mix in the previous example.

After projection under the same conditions, the formed material is found to have spread very well [smoother surface (roughness Ra=25 μm) and lower thickness (2 trim)]. The lower volume mass of the mix allows a slower flow of the mix (58 kg/hour) from the spraying machine, which contributes to an improvement in quality and fineness of the deposit.

It is found that the fraction consisting of oxidizable particles (Si+Al) is no longer subject to segregation (downward concentration) when the mix is exposed to shaking or vibration. In contrast to the dry mix of the previous example in which the combustible particles do not adhere to the surface of the particles of siliceous glass, the mix in example 2 no longer has this tendency to segregation.

EXAMPLE 3

In relation to example 2, part of the crushed siliceous glass has been replaced by a fine silica sand in order to increase the refractoriness of the resulting mass.

The mix therefore comprises:
- 55% crushed silico-sodo-calcic glass (0.2-1 mm)
- 10% silica sand (quartz) (0.1-03 mm)
- 20% silicon (<50 µm)
- 8% aluminium (<63 µm)
- 7% expanded perlite (fraction<1 mm)

and its specific volume is 1.6 liter/kg.

Here, as in example 2, the mass flow has been slowed (56 kg/hour), which leads to a thinner deposit and an even more uniform surface (thickness per passage=1.5 mm; roughness Ra=20 µm).

The resulting deposit is then annealed at 1250° C. for 5 hours which completes the densification; it has retained its vitreous aspect and has no tendency to flow up to this temperature; it still adheres perfectly to the refractory support, even after cooling.

Finally, it has also been found that, on projection, the mass generated in molten state penetrates deeply into fine cracks, which facilitates their filling without forming extra thickness on the surface of the damaged refractory.

It must be understood that the present invention is in no way restricted to the embodiments and processes described above, and that modifications may be made to this without leaving the framework of the attached claims.

EXAMPLE 4

In order to perform anchorage perforations in the damaged refractory blocks of the superstructure of a glass-making furnace, the following mix has been manufactured:
- 20% Al powder (<63 µm)
- 30% expanded perlite (fraction<1 mm)
- 50% lime (CaO) (<250 µm).

Due to the high content of expanded perlite (increase in volume fraction), it is possible to increase substantially the percentage of combustible particles (more reaction enthalpy without increase of the risks of explosion or back-combustion) and in an unusual manner the content of fine lime (increased flux effect).

The perforations so carried out in the refractory blocks have been allowed their repair by ceramic welding.

It is noted that, in this experimentation, the perforation mix according to the invention does not include refractory particles, currently used in the process of ceramic welding type.

The invention claimed is:

1. Dry mix for treating refractory substrates, comprising combustible particles of at least one oxidizable substance which, in the presence of oxygen, gives rise to an exothermic reaction, and
particles of at least one other substance,
wherein these particles together form, during said exothermic reaction, a coherent mass capable of adhering to and/or interacting with a treated substrate,
this mix comprising, as particles of at least one other substance, particles of at least one expanding substance, the dry mix without the particles of this at least one expanding substance having a first bulk density and the dry mix comprising said at least one expanding substance having a second bulk density lower than said first bulk density,
characterised in that said mix also comprises, as particles of at least one other substance, particles of at least one siliceous glass, which have a weight fraction greater than any other constituent in the mix, said mix containing:
a) 45 to 60% by weight of siliceous glass particles;
b) 20 to 30% by weight of combustible particles;
c) 5 to 10% by weight of expanded perlite particles; and
d) 10 to 25% by weight of silica particles.

2. Mix according to claim 1, characterised in that the expanded perlite consists of grains of a density of less than 2.

3. Mix according to claim 1, characterised in that the silica particles are selected from the group consisting of vitreous or fused silica, crystalline silica and mixtures thereof.

4. Mix according to claim 1, characterised in that the siliceous glass particles are selected from the group consisting of silico-sodo-calcic glasses, borosilicates, cullet or broken glass, and mixtures thereof.

5. Mix according to claim 1, characterised in that it has a weight ratio between the particles of siliceous glass and the particles of silica of between 3/1 and 6/1.

6. Mix according to claim 1, characterised in that said combustible particle is selected from the group consisting of Si, Al, Zr, Mg, Ca, Fe, Cr, Ti, and combinations and alloys thereof.

7. Mix according to claim 1, characterised in that the maximum size of the particles of expanded perlite is less than or equal to 1 mm.

8. Mix according to claim 1, characterised in that the maximum size of the combustible particles is less than or equal to 100 µm.

9. Mix according to claim 1, characterised in that the maximum size of the silica particles is less than or equal to 0.5 mm.

10. Mix according to claim 1, characterised in that the maximum size of the siliceous glass particles is less than or equal to 1 mm.

* * * * *